US011858111B2

(12) United States Patent
Huang

(10) Patent No.: US 11,858,111 B2
(45) Date of Patent: Jan. 2, 2024

(54) FOLDABLE TORQUE TOOL

(71) Applicant: Hung-Wen Huang, Taichung (TW)

(72) Inventor: Hung-Wen Huang, Taichung (TW)

(*) Notice: Subject to any disclaimer, the term of this patent is extended or adjusted under 35 U.S.C. 154(b) by 255 days.

(21) Appl. No.: 17/554,747

(22) Filed: Dec. 17, 2021

(65) Prior Publication Data

US 2022/0305637 A1 Sep. 29, 2022

(30) Foreign Application Priority Data

Mar. 26, 2021 (TW) ................................. 110111108

(51) Int. Cl.

| | |
|---|---|
| ***B25G 1/08*** | (2006.01) |
| ***B25B 23/00*** | (2006.01) |
| ***B25B 23/142*** | (2006.01) |
| ***B25F 1/02*** | (2006.01) |
| ***B25G 3/38*** | (2006.01) |

(52) U.S. Cl.

CPC .......... *B25G 1/085* (2013.01); *B25B 23/0042* (2013.01); *B25B 23/142* (2013.01); *B25F 1/02* (2013.01); *B25G 3/38* (2013.01)

(58) Field of Classification Search

CPC ...... B25G 3/38; B25G 1/085; B25B 23/0042; B25B 23/142; B25F 1/02

See application file for complete search history.

(56) References Cited

U.S. PATENT DOCUMENTS

| | | | | |
|---|---|---|---|---|
| 6,564,680 | B1 * | 5/2003 | Rinner | B25G 1/066 81/177.5 |
| 8,342,062 | B2 * | 1/2013 | Chen | B25G 1/085 81/177.9 |
| 8,621,963 | B2 * | 1/2014 | Johnson | B25B 23/16 81/177.5 |
| 9,533,404 | B2 * | 1/2017 | Hu | B25G 1/085 |
| 9,676,083 | B2 * | 6/2017 | Johnson | B25G 3/38 |
| 9,724,817 | B2 * | 8/2017 | Hongquan | B25G 1/066 |
| 10,343,273 | B2 * | 7/2019 | Johnson | B25B 23/16 |

* cited by examiner

*Primary Examiner* — David B. Thomas

(74) *Attorney, Agent, or Firm* — MUNCY, GEISSLER, OLDS & LOWE, P.C.

(57) ABSTRACT

A foldable torque tool is provided, including a handle, a driving member and a blocking structure. The driving member is rotatably disposed on the handle. The blocking structure has a first blocking unit and a second blocking unit. The first blocking unit is disposed on the handle. The second blocking unit is disposed on the driving member. When the driving member is in an unfolded position, the first blocking unit is blocked with the second blocking unit, and then the driving member is non-rotatable to a folded position.

10 Claims, 11 Drawing Sheets

FOLDABLE TORQUE TOOL

BACKGROUND OF THE INVENTION

Field of the Invention

The present invention relates to a foldable torque tool.

Description of the Prior Art

Generally, hand tools with sockets or bits are used to rotate fasteners for operations of assembling and disassembling. To avoid damage to the fasteners due to over rotation, a torque tool is developed. A maximum torque value of a conventional torque tool is adjustable according to the operating environment so as to resolve the problem as described above.

However, the conventional torque tool is operated in a single way, which limits an application range; and the conventional torque tool has a fixed volume, which is inconvenient to storage and carry.

The present invention is, therefore, arisen to obviate or at least mitigate the above-mentioned disadvantages.

SUMMARY OF THE INVENTION

The main object of the present invention is to provide a foldable torque tool, which provides different operating ways to meet various requirements and is convenient to use.

To achieve the above and other objects, the present invention provides a foldable torque tool, including: a handle, a driving member and a blocking structure. The handle includes an inner space, a first opening and a second opening which are respectively communicated with the inner space, and an opening direction of the first opening is lateral to an opening direction of the second opening. The first opening is laterally communicated with the second opening. The driving member is configured to drive an object to rotate, and the driving member is idled when a torque greater than a predetermined torque value is exerted thereon. The driving member is disposed within the inner space and is rotatable about an axis of rotation between a folded position and an unfolded position. An axis of the driving member extends in a direction toward the first opening when the driving member is in the folded position, and the driving member partially protrudes beyond the handle through the second opening when the driving member is in the unfolded position. A direction that the driving member is rotated from the unfolded position to the folded position is defined as a first switch direction. The blocking structure includes a first blocking unit and a second blocking unit. The first blocking unit is disposed on an inner wall of the handle, and the second blocking unit is disposed on the driving member. When the driving member is in the unfolded position, the first blocking unit is located at a side of the axis of rotation, and the first blocking unit is blocked with the second blocking unit in the first switch direction so that the driving member is non-rotatable to the folded position along the first switch direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
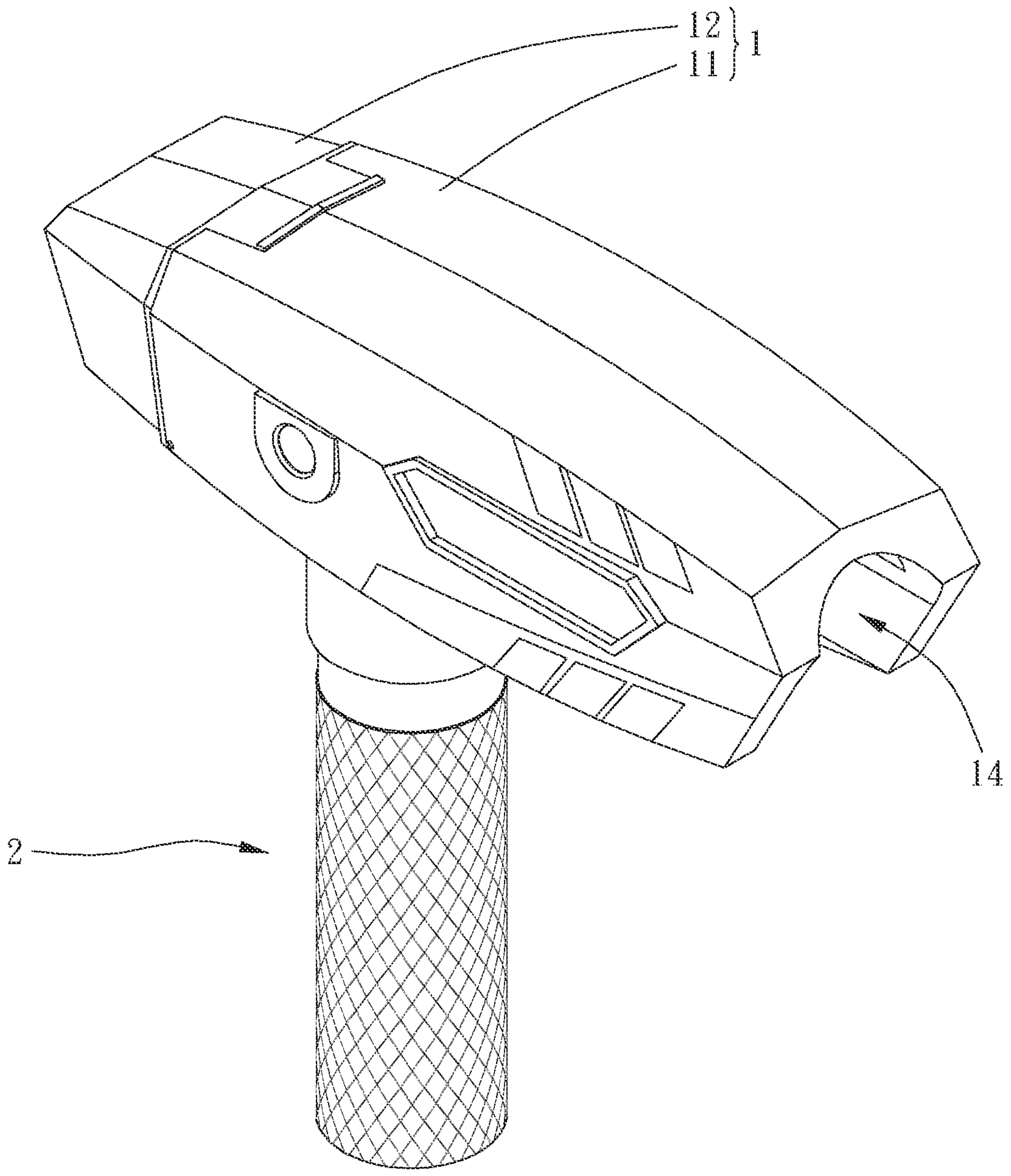
FIG. 1 is a stereogram of a preferable embodiment of the present invention.
Figure 2:
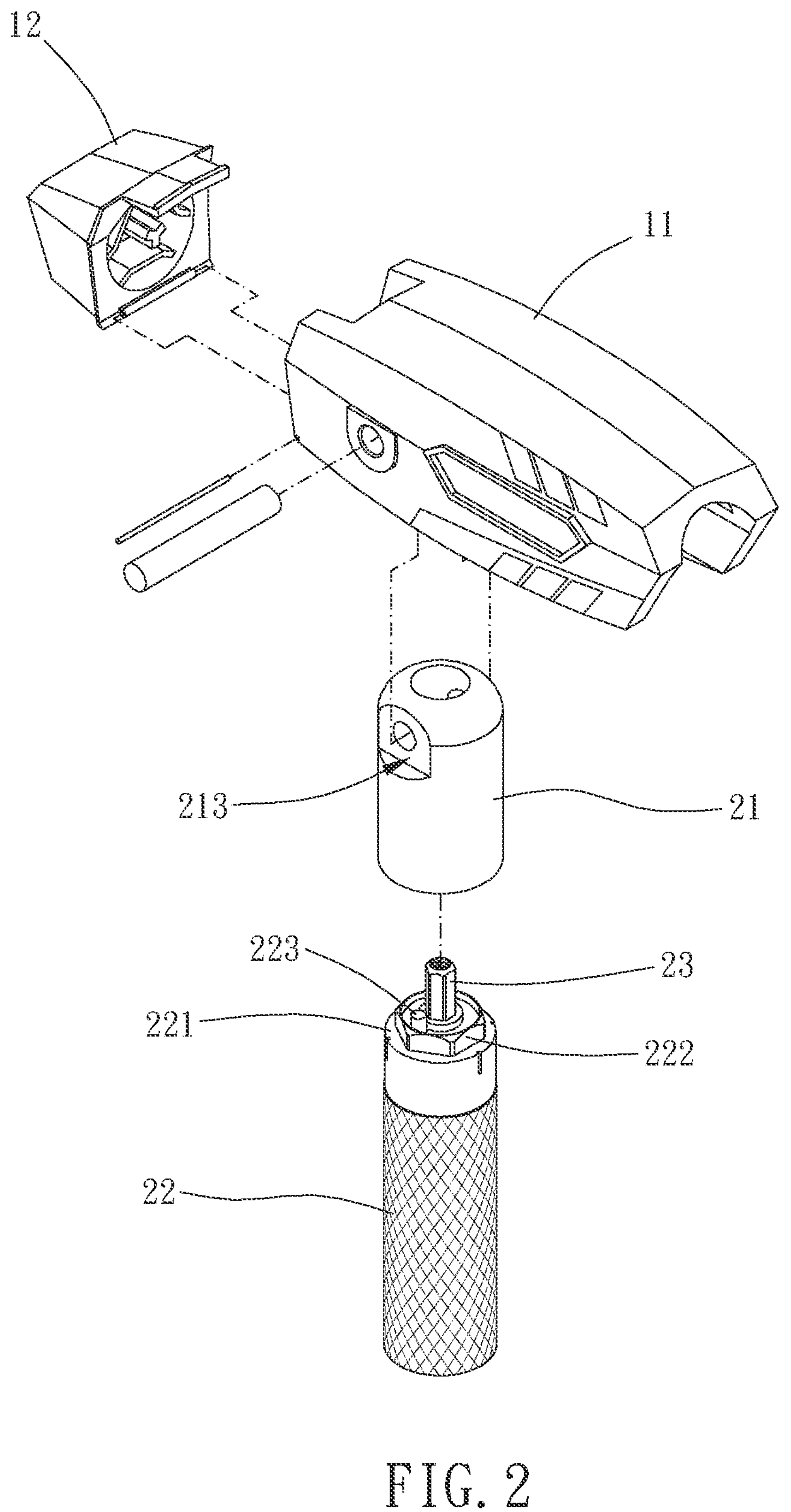
FIG. 2 is a breakdown drawing of FIG. 1.
Figure 3:
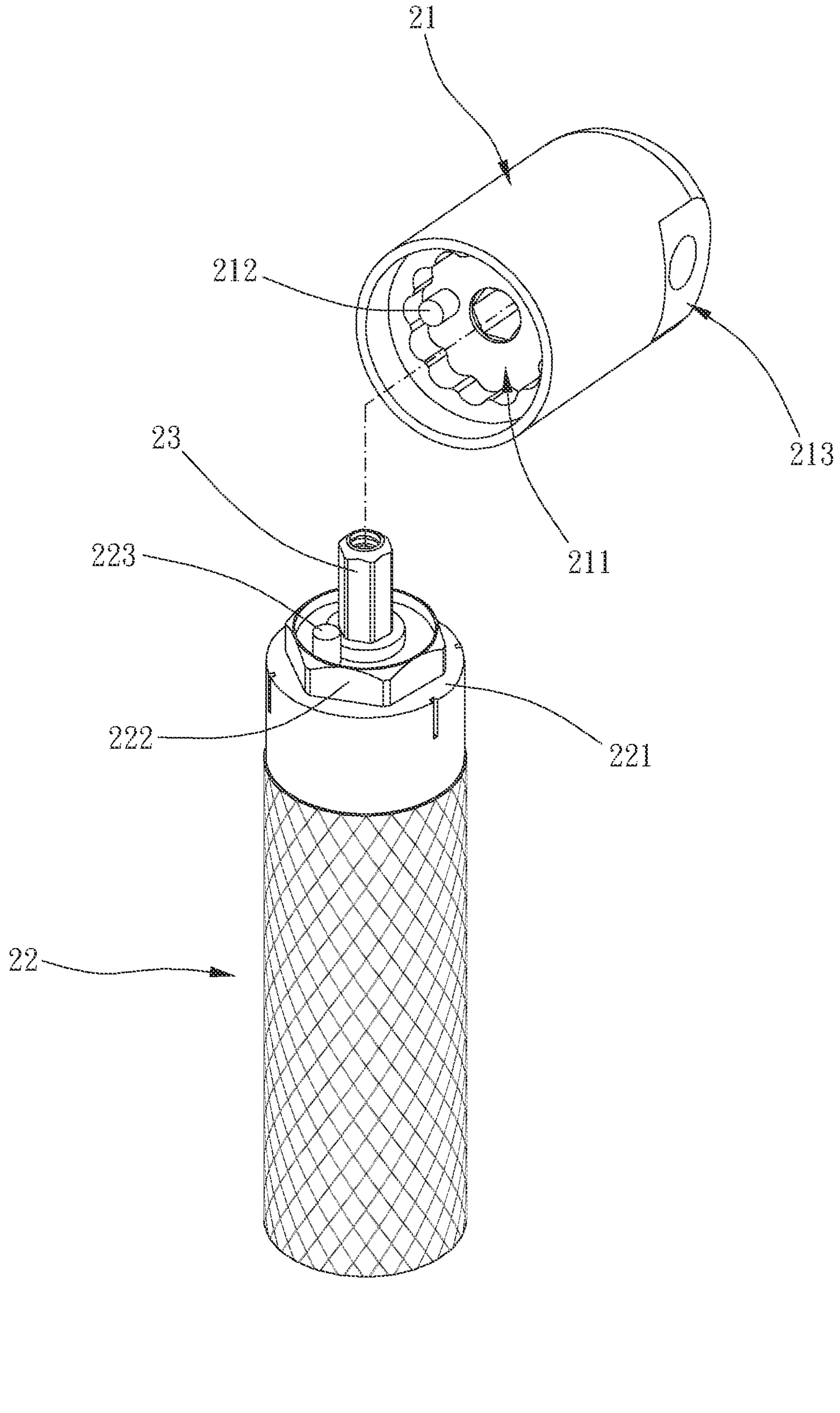
FIG. 3 is a partial breakdown drawing of a driving member according to a preferable embodiment of the present invention.
Figure 4:
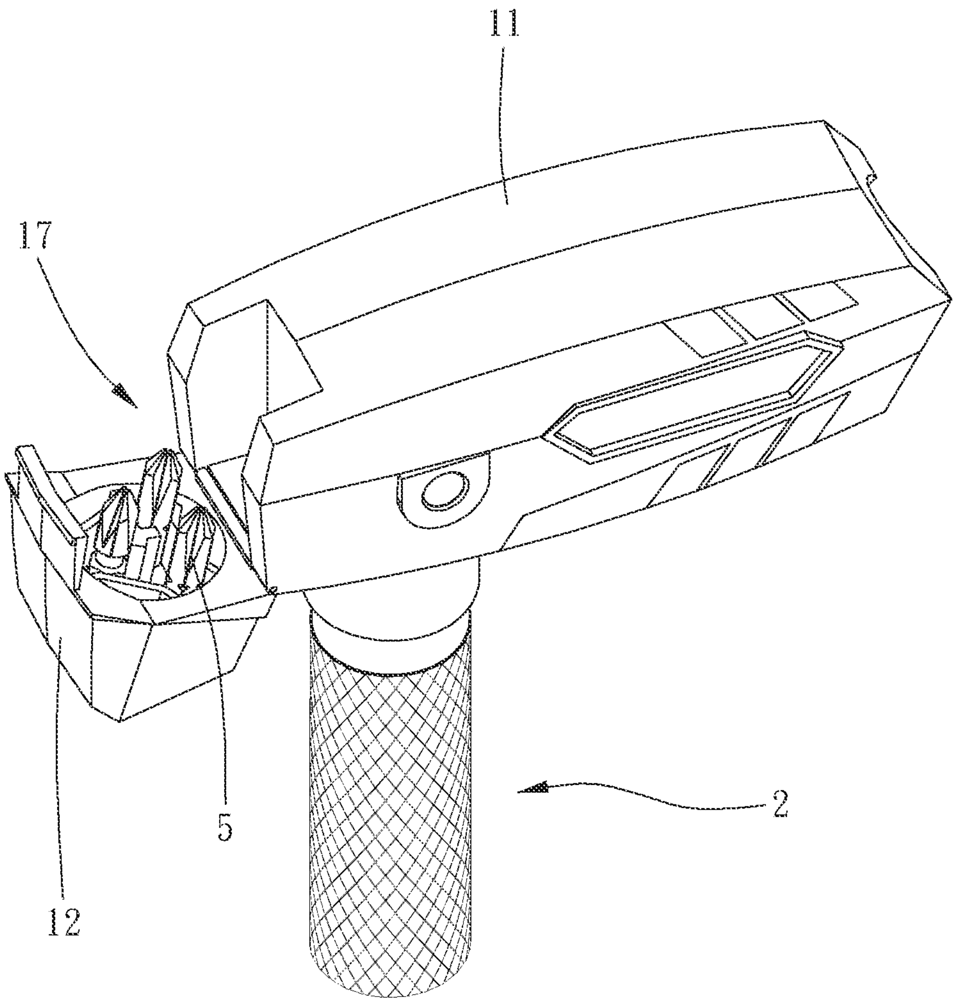
FIG. 4 is a stereogram of a preferable embodiment of the present invention when a second member is opened.

Please refer to FIGS. 1 to 11 for a preferable embodiment of the present invention. A foldable torque tool of the present invention includes a handle 1, a driving member 2 and a blocking structure 3.

The handle 1 includes an inner space 13, a first opening 14 and a second opening 15 which are respectively communicated with the inner space 13. An opening direction of the first opening 14 is lateral to an opening direction of the second opening 15, and the first opening 14 is laterally communicated with the second opening 15.

Figure 5:
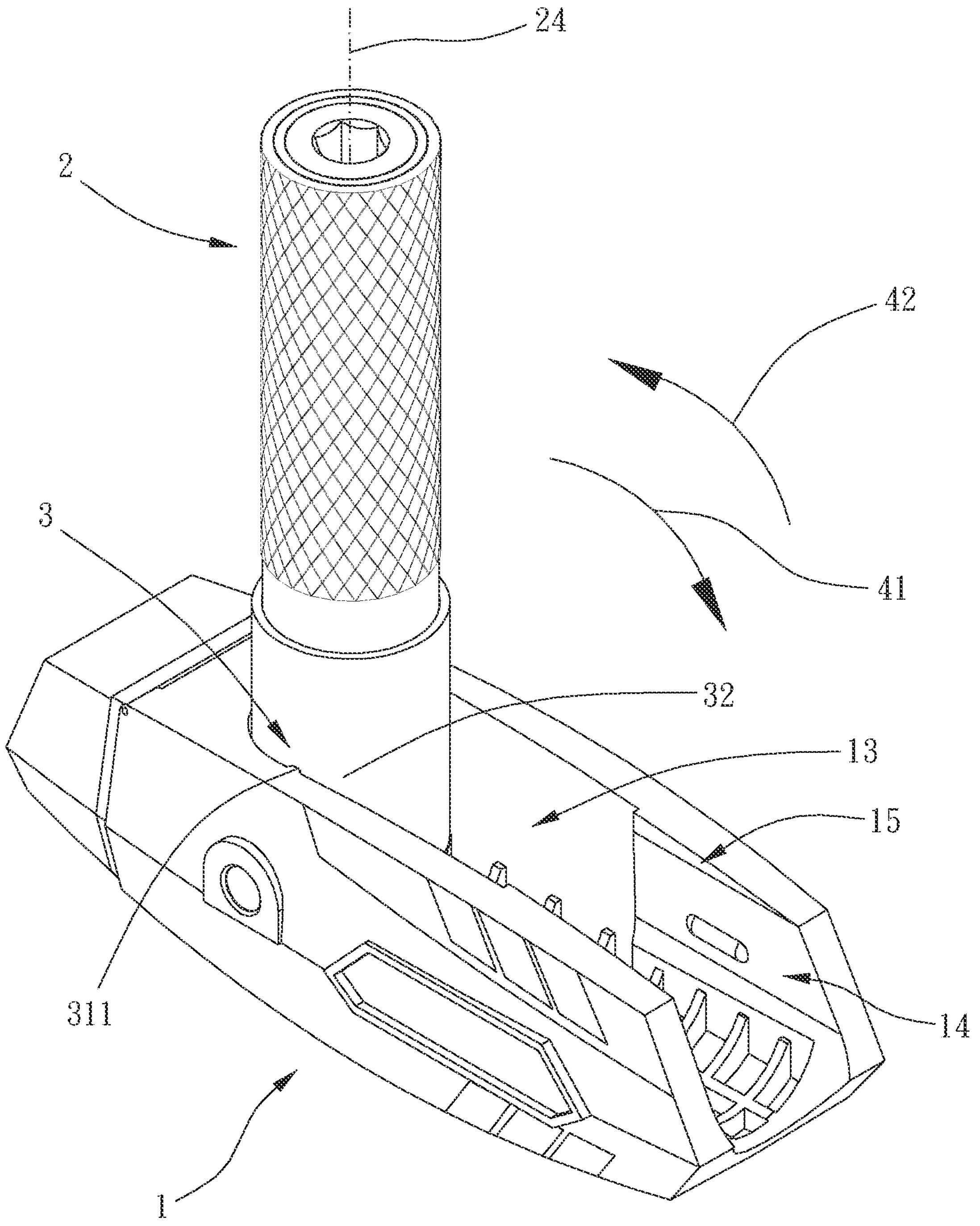
FIG. 5 is a drawing showing the driving member in an unfolded position according to a preferable embodiment of the present invention.
Figure 6:
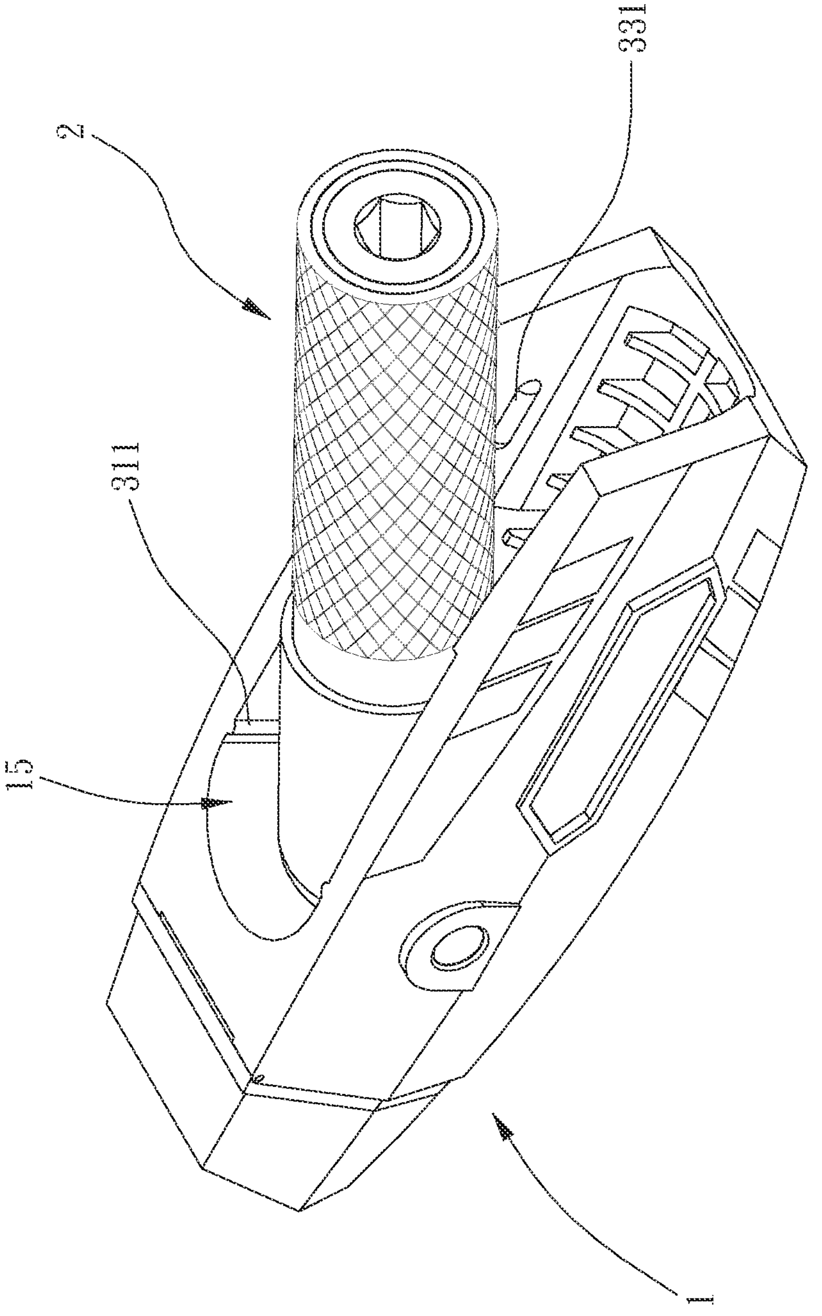
FIG. 6 is a drawing of a preferable embodiment of the present invention when the driving member is operated between the unfolded position and a folded position.
Figure 7:
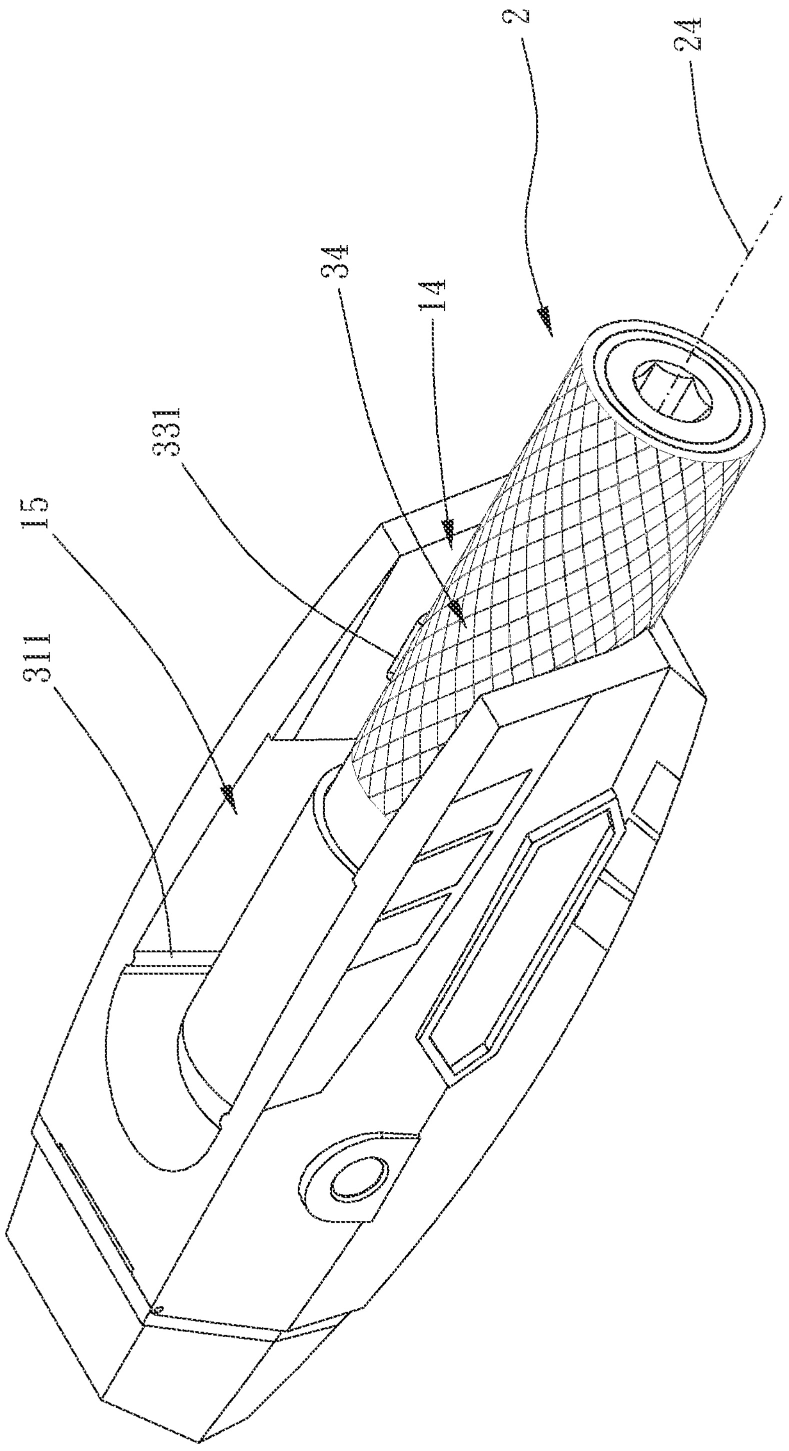
FIG. 7 is a drawing showing the driving member in the folded position according to f a preferable embodiment of the present invention.
Figure 8:
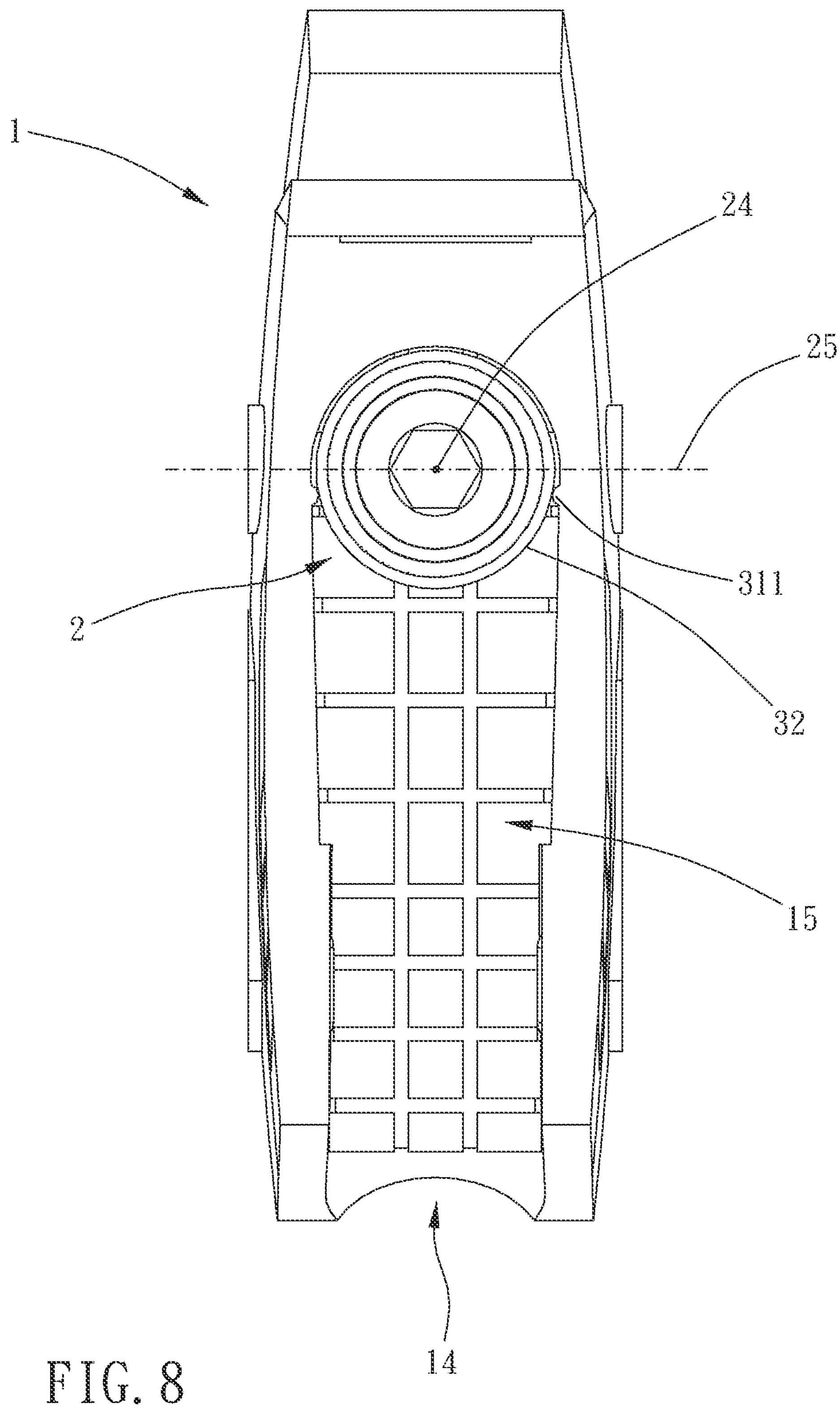
FIG. 8 is a top view of FIG. 5.
Figure 9:
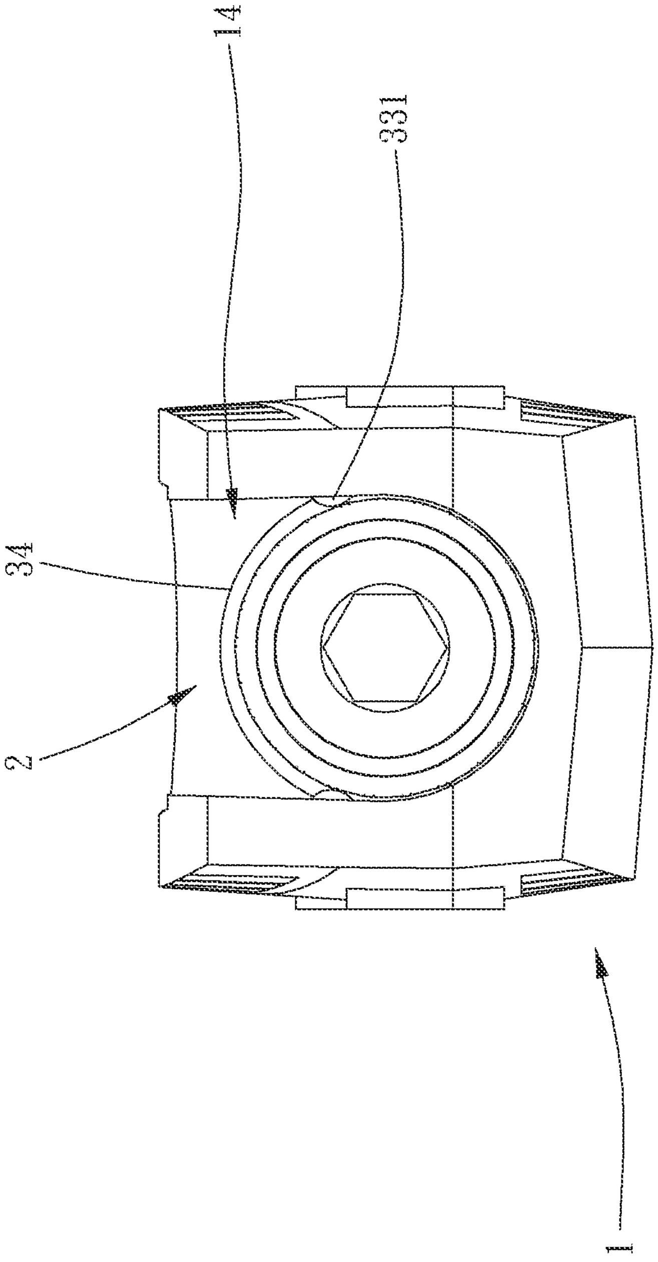
FIG. 9 is a side view of FIG. 7.
Figure 10:
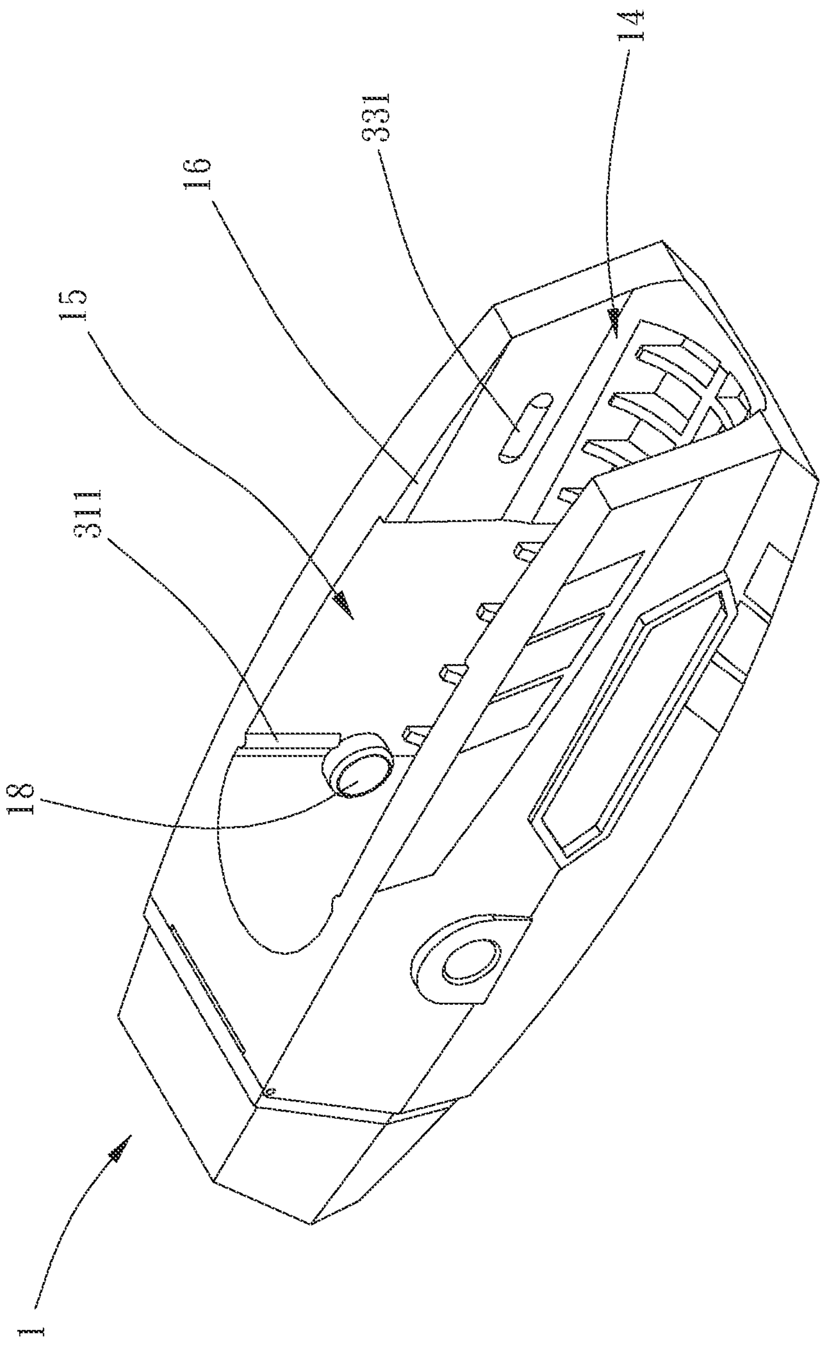
FIG. 10 is a stereogram of a handle according to a preferable embodiment of the present invention.
Figure 11:
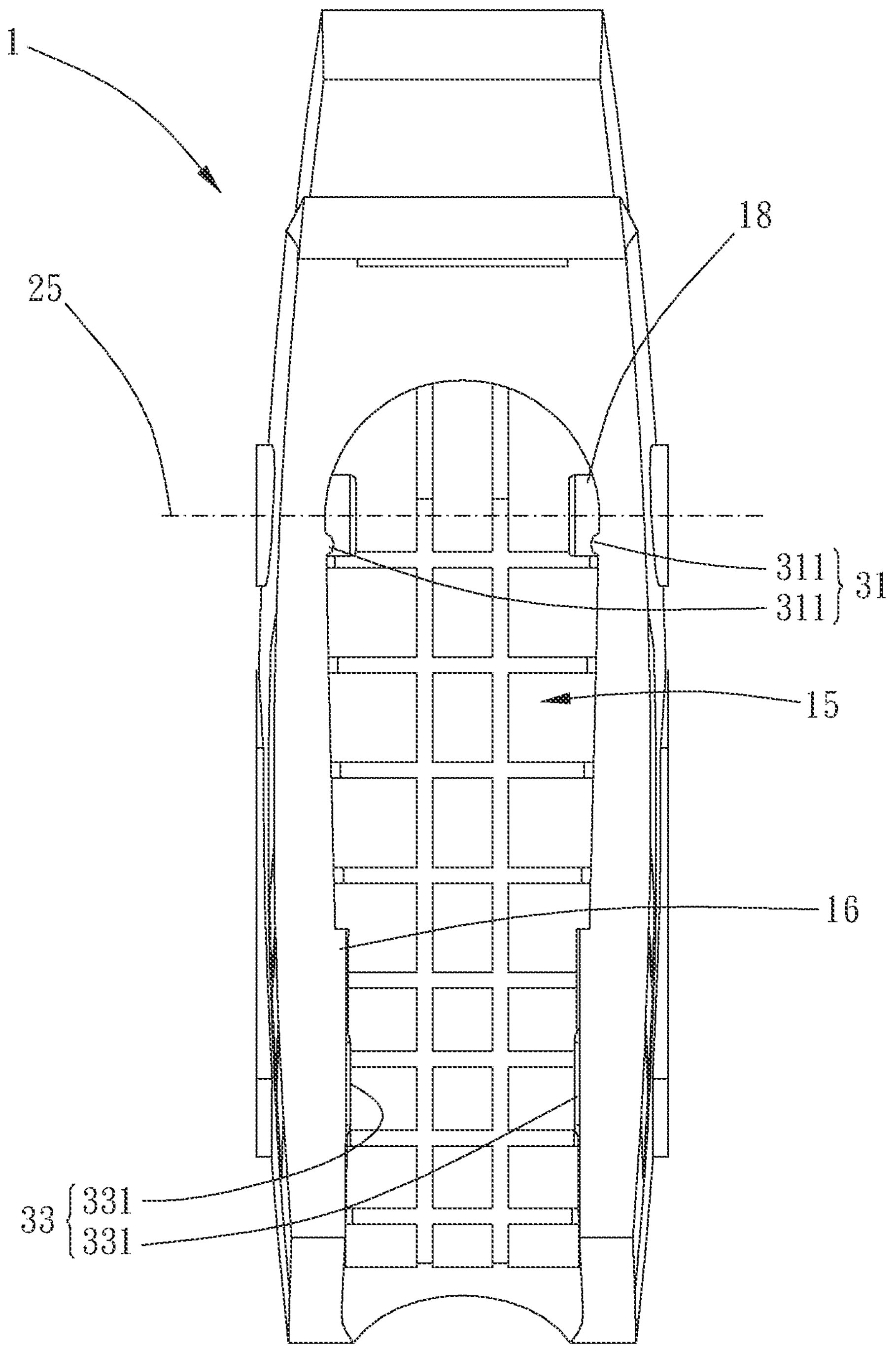
FIG. 11 is a top view of FIG. 10.

The driving member 2 is configured to drive an object to rotate, and the driving member 2 is idled when a torque greater than a predetermined torque value is exerted thereon. The driving member 2 is disposed within the inner space 13 and is rotatable about an axis of rotation 25 between a folded position and an unfolded position. An axis 24 of the driving member 2 extends in a direction toward the first opening 14 when the driving member 2 is in the folded position. In this embodiment, the foldable torque tool which is folded is rod-shaped (as shown in FIG. 7), which provides a smaller volume and is portable and easy to storage, and the foldable torque tool can be used as a screwdriver. The driving member 2 partially protrudes beyond the handle 1 through the second opening 15 when the driving member 2 is in the unfolded position. In this embodiment, the foldable torque tool which is unfolded is T-shaped (as shown in FIG. 5) so that the handle 1 provides a large contact area to be held comfortably and a longer moment arm to generate a large torque. A direction that the driving member 2 is rotated from the unfolded position to the folded position is defined as a first switch direction 41.

The blocking structure 3 includes a first blocking unit 31 and a second blocking unit 32. The first blocking unit 31 is disposed on an inner wall of the handle 1, and the second blocking unit 32 is disposed on the driving member 2. When the driving member 2 is in the unfolded position, the first blocking unit 31 is located at a side of the axis of rotation 25, and the first blocking unit 31 is blocked with the second blocking unit 32 in the first switch direction 41 so that the driving member 2 is non-rotatable to the folded position along the first switch direction 41. Therefore, the driving member 2 is stably positioned in the unfolded position, which allows stable operation.

In this embodiment, the handle 1 is made of materials including at least one of plastic and rubber, which provides comfortable grip and anti-slip effect and can be integrally formed with good structural strength. The driving member 2 is a torque socket, which is commonly used.

Preferably, when the driving member 2 is in the folded position, the driving member 2 partially protrudes beyond the handle 1 through the first opening 14 so that the driving member 2 can be rotated to the unfolded position by pushing the protruding portion of the driving member 2.

A direction that the driving member 2 is rotated from the folded position to the unfolded position is defined as a second switch direction 42. The blocking structure 3 further includes a third blocking unit 33 and a fourth blocking unit 34. The third blocking unit 33 is disposed on the inner wall of the handle 1, and the fourth blocking unit 34 is disposed on the driving member 2. When the driving member 2 is in the folded position, the third blocking unit 33 is blocked with the fourth blocking unit 34 in the second switch direction 42 so that the driving member 2 is non-rotatable to the unfolded position along the second switch direction 42. Therefore, the driving member 2 is stably positioned in the folded position.

Specifically, the first blocking unit 31 includes two first elongated blocks 311 disposed on two opposite sides of the second opening 15 so as to provide symmetrical support; and the two first elongated blocks 311 extend linearly from the inner space 13 toward the second opening 15 so as to stably block the second blocking unit 32 in different depth of the inner space 13. Similarly, the third blocking unit 33 includes two second elongated blocks 331, and the two second elongated blocks 331 extend toward the first opening 14. In this embodiment, the second blocking unit 32 and the fourth blocking unit 34 are respectively a portion of an outer surface of the driving member 2.

Moreover, the inner wall of the handle 1 includes two protruding portion 16 located at two opposite sides of the second opening 15, and the two protruding portion 16 extend toward each other and are located on a rotational path of the driving member 2. The driving member 2 is cylindrical, and a distance between the two protruding portions 16 is smaller than or equal to a diametrical dimension of the driving member 2 so that the two protruding portions 16 is blockable with the driving member 2 in the first switch direction 41 or in the second switch direction 42.

Preferably, as viewed in the opening direction of the second opening 15, the two second elongated blocks 331 protrude beyond the two protruding portions 16 so as to be biased against and effectively restrict the driving member 2 in the folded position. Similarly, a distance between the two first elongated block 311 is smaller than or equal to the diametrical dimension of the driving member 2 so that the two first elongated blocks 311 are biased against and restrict the driving member 2 there between.

In this embodiment, the two first elongated blocks 311 extend to an edge defining the second opening 15 so as to stably block the second blocking unit 32 in different depth of the inner space 13.

When the driving member 2 is in the folded position, the driving member 2 is abutted against an edge defining the first opening 14 in the first switch direction 41, which provides stable positioning effect in coordination with the first blocking unit 31. Similarly, when the driving member 2 is in the unfolded position, the driving member 2 is abutted against the edge defining the second opening 15 in the second switch direction 42.

The driving member 2 further includes an adjusting member 21, a main body 22 and a torque adjusting rod 23. The adjusting member 21 is pivotally connected with the handle 1, and the torque adjusting rod 23 is rotatable relative to the main body 22 and disposed within an interior of the main body 22. The torque adjusting rod 23 protrudes beyond an end surface 221 of the main body 22 along the axis 24, and the adjusting member 21 is co-rotatably sleeved to the torque adjusting rod 23 so that the predetermined torque value is adjustable by rotation of the adjusting member 21.

Preferably, the adjusting member 21, the main body 22 and the torque adjusting rod 23 are made of metal, which provides good structural strength and is durable.

The adjusting member 21 has an embedding groove 211, and an opening of the embedding groove 211 faces the end surface 221. The end surface 221 has a fitting portion 222 disposed thereon, and the adjusting member 21 is axially movable relative to the torque adjusting rod 23 between a locked position and an unlocked position. When the adjusting member 21 is in the locked position, the fitting portion 222 is embedded within the embedding groove 211, and the adjusting member 21 is non-rotatable relative to the main body 22. When the adjusting member 21 is in the unlocked position, the fitting portion 222 is departed from the embedding groove 211, and the adjusting member 21 is rotatable relative to the main body 22.

The end surface 221 has a first post 223 disposed thereon, and the adjusting member 21 has a second post 212 disposed thereon. When the adjusting member 21 is sleeved to the torque adjusting rod 23, the first post 223 and the second post 212 are interfered with each other in a circumferential direction around the axis 24, which determines a rotation direction and a maximum angle of rotation of the adjusting member 21. For example, when the second post 212 is radially abutted against one side of the first post 223, the predetermined torque value is a first torque value; and when the adjusting member 21 is rotated clockwise and the second post 212 is radially abutted against another side of the first post 223, the predetermined torque value is changed to a second torque value.

Preferably, two opposite sides of the adjusting member 21 have two cutting notches 213 recessed thereon, and two pivots 18 of the handle 1 are partially located within the inner space 13 and protrude into the two cutting notches 213. Therefore, a weight of the driving member 2 is reduced, and the adjusting member 21 and the two first elongated blocks 311 has sufficient space therebetween, which provides smooth rotation, accurate positioning and stable restriction of the driving member 2.

Furthermore, the handle 1 further includes a first member 11 and a second member 12, and the first member 11 has the inner space 13, the first opening 14 and the second opening 15 disposed thereon. The second member 12 is openably disposed on the first member 11, the first member 11 and the second member 12 define a receiving space 17 therebetween, and the receiving space 17 is configured to receive at least one driving head 5, which is convenient to carry.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A foldable torque tool, including:

a handle, including an inner space, a first opening and a second opening which are respectively communicated with the inner space, an opening direction of the first opening being lateral to an opening direction of the second opening, the first opening being laterally communicated with the second opening;

a driving member, configured to drive an object to rotate, the driving member being idled when a torque greater than a predetermined torque value is exerted thereon, the driving member disposed within the inner space and being rotatable about an axis of rotation between a folded position and an unfolded position, an axis of the driving member extending in a direction toward the first opening when the driving member is in the folded position, the driving member partially protruding beyond the handle through the second opening when the driving member is in the unfolded position, a direction that the driving member is rotated from the unfolded position to the folded position being defined as a first switch direction; and a blocking structure, including a first blocking unit and a second blocking unit, the first blocking unit disposed on an inner wall of the handle, the second blocking unit disposed on the driving member;

wherein when the driving member is in the unfolded position, the first blocking unit is located at a side of the axis of rotation, the first blocking unit is blocked with the second blocking unit in the first switch direction so that the driving member is non-rotatable to the folded position along the first switch direction.

2. The foldable torque tool of claim 1, wherein the handle further includes a first member and a second member, the first member has the inner space, the first opening and the second opening disposed thereon, the second member is openably disposed on the first member, the first member and the second member define a receiving space therebetween, and the receiving space is configured to receive at least one driving head.

3. The foldable torque tool of claim 1, wherein the driving member further includes an adjusting member, a main body and a torque adjusting rod, the adjusting member is pivotally connected with the handle, the torque adjusting rod is rotatable relative to the main body and disposed within an interior of the main body, the torque adjusting rod protrudes beyond an end surface of the main body along the axis, and the adjusting member is co-rotatably sleeved to the torque adjusting rod.

4. The foldable torque tool of claim 3, wherein the adjusting member has an embedding groove, an opening of the embedding groove faces the end surface, the end surface has a fitting portion disposed thereon, the adjusting member is axially movable relative to the torque adjusting rod between a locked position and an unlocked position; when the adjusting member is in the locked position, the fitting portion is embedded within the embedding groove, the adjusting member is non-rotatable relative to the main body; and when the adjusting member is in the unlocked position, the fitting portion is departed from the embedding groove, and the adjusting member is rotatable relative to the main body.

5. The foldable torque tool of claim 3, wherein the end surface has a first post disposed thereon, the adjusting member has a second post disposed thereon, and the first post and the second post are interfered with each other in a circumferential direction around the axis when the adjusting member is sleeved to the torque adjusting rod.

6. The foldable torque tool of claim 1, wherein a direction that the driving member is rotated from the folded position to the unfolded position is defined as a second switch direction; the blocking structure further includes a third blocking unit and a fourth blocking unit, the third blocking unit is disposed on the inner wall of the handle, the fourth blocking unit is disposed on the driving member; and when the driving member is in the folded position, the third blocking unit is blocked with the fourth blocking unit in the second switch direction so that the driving member is non-rotatable to the unfolded position along the second switch direction.

7. The foldable torque tool of claim 6, wherein the first blocking unit includes two first elongated blocks, the two first elongated blocks extend toward the second opening, the third blocking unit includes two second elongated blocks, the two second elongated blocks extend toward the first opening; and the second blocking unit and the fourth blocking unit are respectively a portion of an outer surface of the driving member.

8. The foldable torque tool of claim 7, wherein the handle further includes a first member and a second member, the first member has the inner space, the first opening and the second opening disposed thereon, the second member is openably disposed on the first member, the first member and the second member define a receiving space therebetween, and the receiving space is configured to receive at least one driving head; the driving member further includes an adjusting member, a main body and a torque adjusting rod, the adjusting member is pivotally connected with the handle, the torque adjusting rod is rotatable relative to the main body and disposed within an interior of the main body, the torque adjusting rod protrudes beyond an end surface of the main body along the axis, and the adjusting member is co-rotatably sleeved to the torque adjusting rod; the adjusting member has an embedding groove, an opening of the embedding groove faces the end surface, the end surface has a fitting portion disposed thereon, the adjusting member is axially movable relative to the torque adjusting rod between a locked position and an unlocked position; when the adjusting member is in the locked position, the fitting portion is embedded within the embedding groove, the adjusting member is non-rotatable relative to the main body; and when the adjusting member is in the unlocked position, the fitting portion is departed from the embedding groove, and the adjusting member is rotatable relative to the main body; the end surface has a first post disposed thereon, the adjusting member has a second post disposed thereon, and the first post and the second post are interfered with each other in a circumferential direction around the axis when the adjusting member is sleeved to the torque adjusting rod; the inner wall of the handle includes two protruding portions located at two opposite sides of the second opening, the two protruding portions extend toward each other and are located on a rotational path of the driving member; the driving member is cylindrical, and a distance between the two protruding portions is smaller than or equal to a diametrical dimension of the driving member; when the driving member is in the folded position, the driving member is abutted against an edge defining the first opening in the first switch direction; when the driving member is in the unfolded position, the driving member is abutted against an edge defining the second opening in the second switch direction; the handle is made of materials including at least one of plastic and rubber; the adjusting member, the main body and the torque adjusting rod are made of metal; the driving member is a torque socket; as viewed in the opening direction of the second opening, the two second elongated blocks protrude beyond the two protruding portions; the two first elongated blocks extend to the edge defining the second opening; two opposite sides of the adjusting member have two cutting notches recessed thereon, two pivots of the handle are partially located within the inner space and protrude into the two cutting notches; and a distance between the two first elongated blocks is smaller than or equal to the diametrical dimension of the driving member.

9. The foldable torque tool of claim 1, wherein the inner wall of the handle includes two protruding portions located at two opposite sides of the second opening, the two protruding portions extend toward each other and are located on a rotational path of the driving member; the driving member is cylindrical, and a distance between the two protruding portions is smaller than or equal to a diametrical dimension of the driving member.

10. The foldable torque tool of claim 1, wherein when the driving member is in the folded position, the driving member partially protrudes beyond the handle through the first opening.

* * * * *